United States Patent
Sengupta et al.

(10) Patent No.: US 9,686,192 B2
(45) Date of Patent: Jun. 20, 2017

(54) NETWORK SERVICE SLOTTING

(71) Applicant: Nicira, Inc., Palo Alto, CA (US)

(72) Inventors: Anirban Sengupta, Saratoga, CA (US); Jayant Jain, Cupertino, CA (US); Subrahmanyam Manuguri, San Jose, CA (US)

(73) Assignee: Niciria, Inc., Palo Alto, CA (US)

( * ) Notice: Subject to any disclaimer, the term of this patent is extended or adjusted under 35 U.S.C. 154(b) by 0 days.

(21) Appl. No.: 13/931,227

(22) Filed: Jun. 28, 2013

(65) Prior Publication Data

US 2015/0003453 A1    Jan. 1, 2015

(51) Int. Cl.
*H04L 12/741* (2013.01)
*H04L 29/08* (2006.01)

(52) U.S. Cl.
CPC ............ *H04L 45/74* (2013.01); *H04L 67/327* (2013.01)

(58) Field of Classification Search
CPC ....... H04L 45/04; H04L 45/79; H04L 67/327; H04L 12/4633; H04L 45/74; H04L 47/10
USPC .................................................. 370/389, 392
See application file for complete search history.

(56) References Cited

U.S. PATENT DOCUMENTS

| | | | |
|---|---|---|---|
| 6,822,974 B1 * | 11/2004 | Vaidya | H04J 3/0682 370/401 |
| 6,880,089 B1 | 4/2005 | Bommareddy et al. | |
| 7,818,452 B2 | 10/2010 | Matthews et al. | |
| 7,948,986 B1 | 5/2011 | Ghosh et al. | |
| 8,190,767 B1 | 5/2012 | Maufer et al. | |
| 2003/0093481 A1 | 5/2003 | Mitchell et al. | |
| 2007/0061492 A1 | 3/2007 | van Riel | |
| 2008/0072305 A1 | 3/2008 | Casado et al. | |
| 2009/0129271 A1 | 5/2009 | Ramankutty et al. | |
| 2009/0235325 A1 | 9/2009 | Dimitrakos et al. | |
| 2011/0205959 A1 * | 8/2011 | Aalto et al. | 370/328 |
| 2012/0079478 A1 | 3/2012 | Galles et al. | |
| 2012/0207174 A1 | 8/2012 | Shieh | |
| 2013/0073743 A1 | 3/2013 | Ramasamy et al. | |
| 2013/0163594 A1 * | 6/2013 | Sharma et al. | 370/392 |
| 2013/0227550 A1 | 8/2013 | Weinstein et al. | |
| 2013/0332983 A1 | 12/2013 | Koorevaar et al. | |
| 2014/0068602 A1 | 3/2014 | Gember et al. | |

(Continued)

FOREIGN PATENT DOCUMENTS

| | | |
|---|---|---|
| WO | WO 2008/095010 | 8/2008 |
| WO | WO 2014/210572 | 12/2014 |

OTHER PUBLICATIONS

Cisco, "Enabling Service Chaining on Cisco Nexus 1000V Series", Sep. 2012, 25 pages.

(Continued)

*Primary Examiner* — Jamal Javaid (57) ABSTRACT

Exemplary methods, apparatuses, and systems of packet processing utilize an ordered sequence of packet processing services to process a packet having a destination. The packet is a native, non-proprietary network packet that uses a standard network protocol and standard packet format. The packet processing services include a plurality of physical and/or virtual services. The ordered sequence is determined by applying one or more policy rules. A virtual service insertion platform manages routing of the packet to each service in the ordered sequence of services until all services have processed the packet, then the packet is forwarded to the packet destination.

18 Claims, 3 Drawing Sheets

(56) References Cited

U.S. PATENT DOCUMENTS

2014/0115578 A1    4/2014  Cooper et al.
2014/0280836 A1\*  9/2014  Kumar .................... H04L 49/70
                                                  709/223

OTHER PUBLICATIONS

International Search Report and Written Opinion of PCT/US2014/044751, Dec. 12, 2014 (mailing date), Nicira, Inc.
Guichard, J., et al., "Network Service Chaining Problem Statement," Network Working Group, Jun. 13, 2013, 14 pages, Cisco Systems, Inc.
Joseph, Dilip, et al., "A Policy-aware Switching Layer for Data Centers," Jun. 24, 2008, 26 pages, Electrical Engineering and Computer Sciences, University of California, Berkeley, CA, USA.
Sekar, Vyas, et al., "Design and Implementation of a Consolidated Middlebox Architecture," $9^{th}$ USENIX conference on Networked System Design and Implementation, Apr. 25-27, 2012, 14 pages.
Sherry, Justine, et al., "Making Middleboxes Someone Else's Problem: Network Processing as a Cloud Service," SSIGCOMM, Aug. 13-17, 2012, 12 pages, ACM, Helsinki, Finland.

\* cited by examiner

NETWORK SERVICE SLOTTING

FIELD OF THE INVENTION

The various embodiments described herein relate to processing a packet with an ordered sequence of services before forwarding the packet to a destination address, in a virtual computing environment.

BACKGROUND OF THE INVENTION

A packet of information generated by a source, such as a client computer or virtual machine, comprises a source address, a destination address, and a packet type. Depending upon the type of the packet, it is preferable to process the packet with a plurality of packet processing "services" before sending the packet to its destination. For example, an IP packet generated by a client and to be sent to a destination website may be routed first to a firewall, then a WAN optimizer, before forwarding the packet to the destination website. Determining the ordered sequence of services and managing the processing of a packet in accordance with the ordered sequence is known as "service slotting or chaining."

Current methods of service chaining encapsulate a native packet type, such as an IP packet, inside a non-standard, proprietary, vendor-specific packet, thus requiring proprietary hardware and/or software to implement service chaining. Such a method may include inserting the entire service chain into the metadata portion of the proprietary packet. In a virtual computing environment, service chaining becomes even more complex because a service can be either a physical network service, such as a stand-alone appliance, or a virtual network service within the virtual computing system.

SUMMARY OF THE INVENTION

Improved systems and methods of service slotting can process a packet using native, non-proprietary network packets and standard network protocols. The services in an ordered sequence of services for processing a packet can be physical and/or virtual services. The specific services included in the ordered sequence of services can be determined by applying one or more policy rules.

In one aspect, a method of processing a packet using an ordered sequence of services comprises receiving, from a source such as a virtual machine guest or a client, a packet having source address, a destination address, and a packet type. A policy rule, or a default rule, is used to determine the ordered sequence of services that will be used to process the packet before sending the packet to its destination. The rule is determined from, e.g., a destination address or the packet type. The rule can alternatively be determined from a virtual network interface card address or an identifier associated with a virtual machine. For each service in the ordered sequence of services: state information of the packet is stored in a control block; the destination address of the packet is prepared by modifying the packet header to specify the service as the destination; the packet is forwarded to the service; and a processed packet is received from the service in response to the forwarding. The processed packet is identified by comparing header information of the processed packet with stored state information in the control block. Depending on the type of the service, the header is modified (e.g. MAC redirect service) or the packet is encapsulated inside another header (e.g. Generic Routing Encapsulation), or the packet is punted to the service without modification through a shared memory segment (host-based service), and forwarded to the next service. When all services in the ordered sequence of services have processed the packet, the packet is then sent to the destination that was specified in the packet as received from the virtual machine guest or client.

The term, "services," refers to various network services, whether virtual or physical, including but not limited to Internet Protocol Security (IPsec), Transport Layer Security (TLS), Secure Sockets Layer (SSL), Virtual Private Networks (VPNs), WAN load balancing, Domain Name Service (DNS), Dynamic Host Configuration Protocol (DHCP), firewalls, encryption, decryption, MAC redirect, routing, Cloud and L3 Network URL filtering, Generic Routing Encapsulation (GRE), High Availability (HA), etc. These various services are often provided by separate physical devices or virtual machines. As used herein, forwarding a packet to a service broadly refers to forwarding the packet to an address at which a service will be performed upon the packet, even when the packet is passed between virtual machines within a single physical host. At the address, the service is performed by hardware, software, or both.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Exemplary embodiments described herein process a packet using an ordered sequence of services before forwarding the packet to a destination. The processing of the packet using an ordered sequence of services may be implemented using standard network protocols and standard packet formats. Packet processing services can be physical, virtual, or a combination of these, such that an ordered sequence of packet processing services can readily be implemented in a virtual computing environment. Policy rules for determining an ordered sequence of packet processing services are configured and managed within a virtual service insertion platform accessible by a configuration server.

Figure 1:
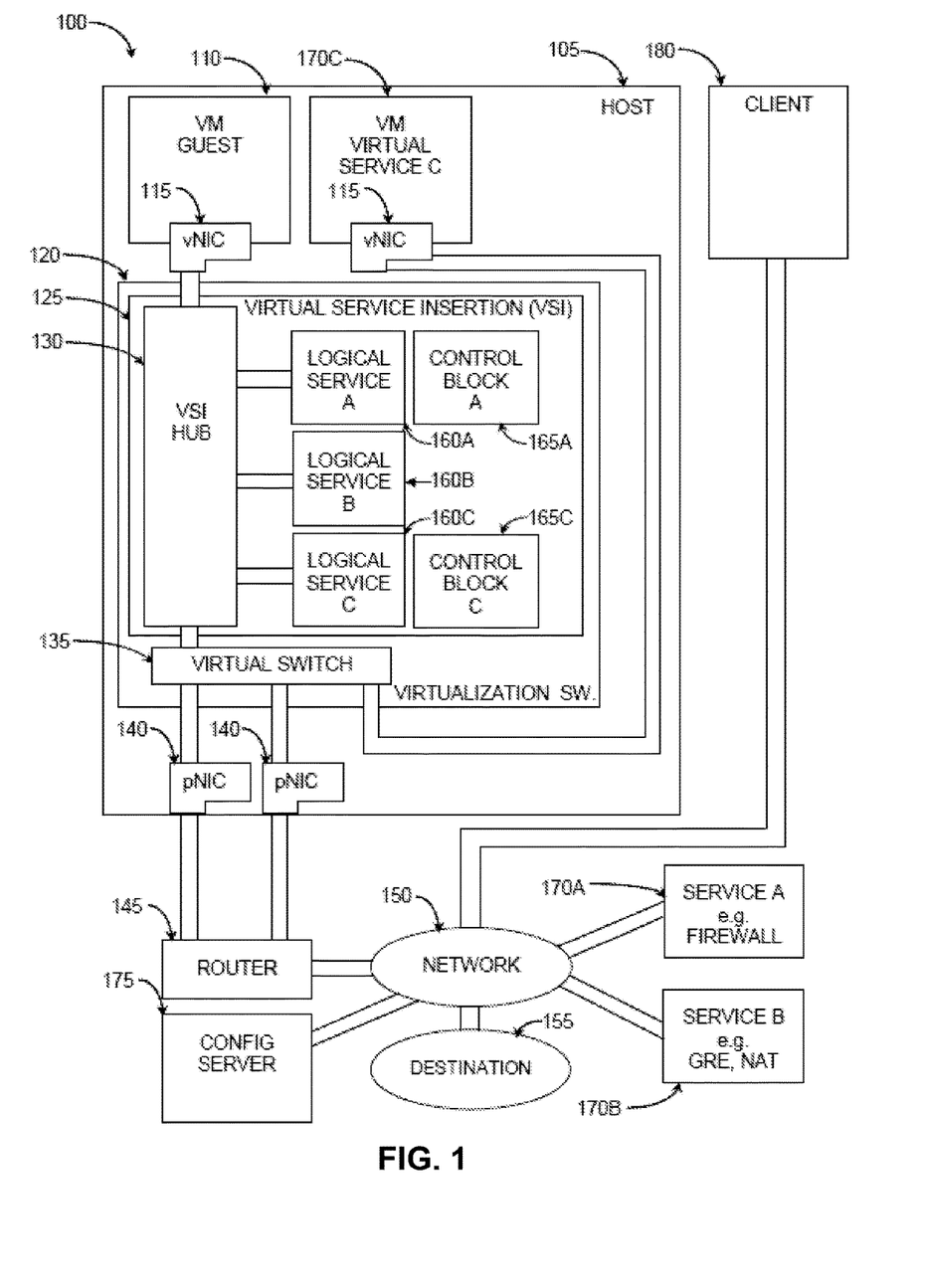
FIG. 1 illustrates the elements of a virtual service insertion platform running on a host in a virtual computing environment.

FIG. 1 illustrates the elements of virtual computing system 100 comprising host computing system 105 implementing one or more virtual machines ("VMs") 110 and 170C. VMs 110 and 170C are complete computation environments, containing virtual equivalents of the hardware and system software components of a physical system. VMs 110 and 170C are typically implemented by an extensive virtualization infrastructure, which includes a variety of software and hardware components.

Host computing system 105 includes virtualization software 120, also referred to herein as hypervisor 120. Hypervisor 120 runs on the hardware of host computing system 105 and manages VMs 110 and 170C access to the host hardware. In some embodiments, hypervisor 120 is hosted and runs on a guest operating system. Hypervisor 120 includes virtual service insertion ("VSI") platform 125, virtual switch 135 and one or more physical network interface cards ("pNIC") 140. Each VM 110 and 170C is coupled to hypervisor 120 by one or more virtual network interface cards ("vNIC") 115. VSI platform 125 includes virtual service insertion ("VSI") hub 130 communicatively coupled to a plurality of logical services such as logical services A, B, and C, labeled 160A, 160B, and 160C respectively. While VSI hub 130 is illustrated and described as being a part of hypervisor 120, in an alternate embodiment, VSI hub 130 is implemented within a VM within host 105 or externally to host 105. For example, VSI hub 130 may be implemented within router 145 or within a separate host computing system 105. In another embodiment, VSI hub 130 may be implemented as a virtual appliance (not shown) that may be run on either a Type 1 or Type 2 hypervisor 120. VSI hub 130 is coupled to one or more vNICs 115. VSI hub 130 is further coupled to virtual switch 135. One or more bidirectional ports of virtual switch 135 are coupled to pNICs 140. One or more bidirectional ports of virtual switch 135 may further be coupled to a virtual service provided by a VM within host 105, such as virtual service C 170C. Virtual service C 170C can be, for example, a WAN optimizer. pNICs 140 are coupled to router 145. Router 145 is coupled to network 150 (e.g., a local area network or other private or publically accessible wide area network, such as the Internet). Network 150 is further coupled to one or more services 170A and 170B, a destination device 155, one or more client computers 180, and a configuration server 175.

Configuration server 175 is communicatively coupled to VSI platform 125 to configure operation of VSI platform 125, including management of policy rules, configuration, monitoring, and diagnostics of virtual switch 135, configuration of VSI hub 130, logical services, and control blocks. Additionally, configuration server 175 may be responsible for provisioning and maintaining a multitude of VMs 110 and 170C implemented across one or more hosts 105.

Client 180 is communicatively coupled to network 150 and, thereby, to VM guest 110 and services 170A, 170B, and 170C through intervening system elements, e.g., as illustrated in FIG. 1. Virtual computing system 100 allows client devices 180 to access centrally-managed user virtual desktops, e.g., implemented by VM guest 110 running in a datacenter, via network(s) 150. For example, client 180 and VM guest 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM guest 110.

The term "desktop," as used herein, refers to a human interface environment through which users can launch, interact with, and manage applications, settings, and/or data, etc. A virtual desktop is a virtual computing system that operates as a desktop or workstation computer with which an end user can interact using desktop remoting protocol and the software and/or hardware of client 180. A virtualized desktop may export user interfaces, e.g., keyboard and mouse input, audio and visual output, to client 180 from VM guest 110 running remotely (in a datacenter). Client 180 transmits user input, e.g., keyboard or mouse input, to VM guest 110 to be processed, and receives display and other data, such as sound, from VM guest 110 for presentation to a user of client 180. Client 180 presents a bitmap representation of the desktop generated by VM guest 110. Input to and output from the virtualized desktop are reflected in the bitmap representation on client 180 as it occurs on the virtualized desktop within VM guest 110.

VSI hub 130 instantiates a logical service, e.g., 160A, 160B, and 160C, corresponding to packet processing services 170A, 170B, and 170C, respectively. Packet processing services 170A-C may be implemented by a physical network service device (e.g. a stand-alone box) or a virtual network service (e.g. a virtual machine running in host 105), or another host computing system. Logical services 160A-C communicate with VSI hub 130 to manage routing of the packet through the ordered sequence of services.

For example, in response to a command from client 180, VM guest 110 generates an IP packet with a source address of VM guest 110 and destination address of destination 155. VM guest 110 passes the packet to vNIC 115 that in turn passes the packet to VSI hub 130. In one embodiment, VSI hub 130 inspects the packet to determine one or more of the packet type, source address, destination address, etc., and applies a rule that the IP packet should be passed first to logical service A 160A. Alternatively, VSI hub 130 passes the IP packet to logical service A 160A for processing without inspection. Instead, logical service A 160A inspects the packet and applies a rule to determine the ordered sequence of services, or a portion thereof, that will process the packet before forwarding the packet to destination 155.

If logical service A 160A is the first service to be applied to the packet, logical service A 160A generates a control block 165A that stores state information of the packet. State information includes, e.g., a header of the packet that comprises the source address and destination address of the packet. State information can further include any/all of a direction of the packet (e.g. outbound to a service or inbound returning from a service), the type of packet, the policy rule, and the ordered sequence of services. VSI platform 125 maintains a pool of control blocks 165A-C for each vNIC 115 for each logical service 160A-1C.

Following the example above, the source address identifies VM guest 110 that generated the packet, or vNIC 115 of VM guest 110, and the destination address identifies destination 155. The direction is outbound from VM guest 110. Logical service A 160A, after generating control block 165A, prepares the packet for forwarding to service A 170A (e.g., a firewall) via VSI hub 130, virtual switch 135, pNIC 140, router 145, and network 150. Further details of packet processing within VSI platform 125 and through a network service chain are described with reference to FIG. 2.

Figure 2:
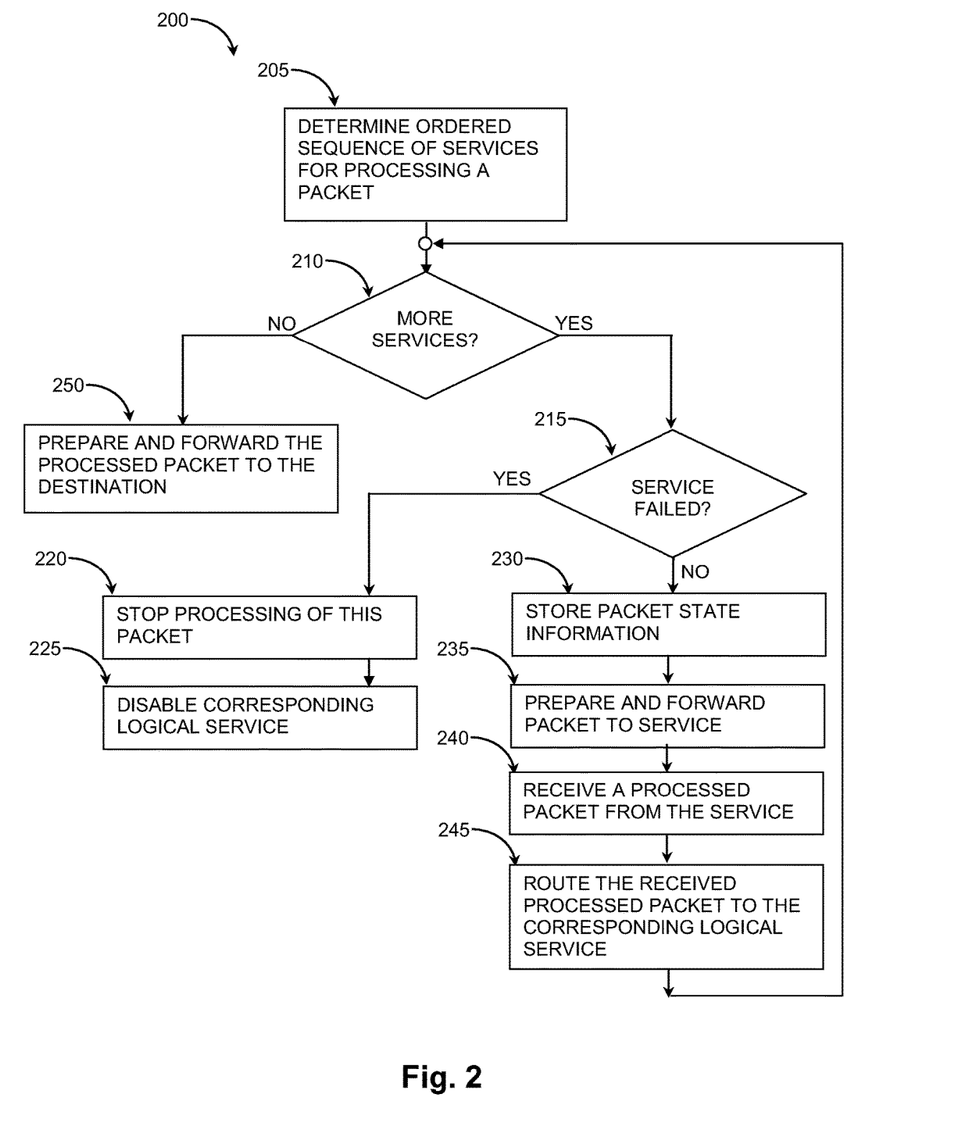
FIG. 2 illustrates, in block diagram form, an exemplary method of processing a packet using an ordered sequence of services.

FIG. 2 illustrates, in block diagram form, an exemplary method 200 of processing a packet using an ordered sequence of services (also referred to herein as a network service chain). In block 205, a packet generated by, e.g., VM 110 is received by VSI hub 130 and inspected to determine an ordered sequence of services for processing the packet. Inspecting includes any of determining a source address of the packet, a destination address of the packet, and a type of the packet. The ordered sequence of services can be described in a policy rule to be applied to the packet based upon the attributes of the packet. For example, a policy rule may be applied to packets originating from a particular source address. Alternatively, a policy rule may be applied to packets having a particular destination address. A policy rule may also be applied to packets of a particular type. A policy rule may alternatively be defined for a particular tenant or group of tenants of the system 100. For example, an IP packet generated by a VM 110 having a destination 155, e.g. an external server accessed via the Internet, may trigger a rule to process the packet with an ordered sequence of services that includes, service A 170A (e.g. firewall), service B 170B (e.g. Cloud/L3 URL filtering), and service C 170C (e.g. WAN load balancing) before sending the packet to destination 155. A packet generated by a first VM 110 that is to be sent via VSI hub 130 to second VM 110, e.g., on the same host 105, within a single tenant, within a single VLAN, etc., may not trigger application of a policy rule that would generate an ordered sequence of services. Alternatively, a default ordered sequence of services may be used with, or without, inspecting the packet (all packets are subjected to the default ordered sequence of services).

At block 210, if there are more services of the ordered sequence of services that have yet to process the packet, then the method proceeds to block 215. Otherwise, at block 250, VSI 125 prepares and forwards the packet to the destination of the packet as specified in the packet originally generated by the VM guest 110. Preparing the packet may comprise restoring one or more of the source and destination address to the values specified in the packet originally generated by the VM 110. Preparing the packet may further comprise setting the direction in the packet header to indicate that the packet is outbound. If there are more services in the ordered sequence that have yet to process the packet, the packet is forwarded to the next logical service in the ordered sequence.

At block 215, if the next service in the ordered sequence of services has failed, then processing of the packet branches to block 220. Otherwise, processing of packet continues at block 230. A service, whether virtual or physical, may fail such that the service is unable to receive a prepared and forwarded packet, unable to return a processed packet in response to a prepared and forwarded packet, or both, within a predetermined period of time. A service failure can also be based upon notice of a lost connection to the service. The predetermined period of time may be determined from the nature and/or location of the service, empirical, measured, or predicted response times, and combinations of these. The predetermined period of time may be different for each service in the ordered sequence of services. The predetermined period of time may further be modified by configuration server 175.

In one embodiment, at block 220, VSI 125 stops processing of this packet (i.e., the packet is dropped) because a service in the ordered sequence has failed. If any of the services in the ordered sequence have already processed the packet, the stored state information control blocks for those services may be deleted as a part of stopping the processing of this packet. Alternatively, or in addition, some or all of the packet state information control blocks may be deleted for a failed service. In another embodiment, VSI 125 skips the failed service, for a configurable amount of time or until the service is restored, and method 200 resumes at block 210. Additionally, VSI 125 may determine whether to drop the packet in response to a failed service or to skip the failed service based upon the type of service that has failed. For example, a policy may indicate that packets are dropped in response to a firewall failure while a failed load balancing service may be skipped.

At block 225, the logical service that corresponds to the failed service may be logically disabled (if not previously disabled). For example, configuration server 175 may disable or re-enable a logical service in response to the above-described determination that the service failed (e.g., at block 215) or in response to a command from an administrator. In one embodiment, logically disabling a failed service removes the failed service from the ordered sequence of services. Alternatively, logically disabling a service stores the failed state for subsequent packets (e.g., when processed at block 215) until the service is restored or removed from the ordered sequence.

If the service has not failed, at block 230, the logical service receives the packet and generates a control block that stores state information of the packet. State information includes, e.g., a header of the packet that comprises the source address and destination address of the packet and any modification made/to be made to the packet. In one embodiment, modification of the packet includes altering the destination address to forward the packet to the network service that corresponds to the logical service. State information can further include any/all of a modified source address for the packet, a direction of the packet, a policy rule that determines the ordered sequence of services that will process the packet, and the ordered sequence of services.

At block 235, the logical service prepares the packet and forwards the packet to the service, physical or virtual, that corresponds to the logical service. Preparing the packet comprises ensuring that the direction bit is set to indicate that the packet is an outbound packet and setting the destination address in the packet to the address of the physical or virtual service that is to process the packet. In one embodiment, preparation of the packet includes modifying one or both of the source and destination addresses in the header of the packet.

At block 240, VSI hub 130 receives a processed packet from virtual switch 135. The processed packet is received in response to the packet prepared and forwarded in block 235. The processed packet corresponds to the packet prepared and forwarded in block 235 after a network service has been applied to the packet prepared and forwarded in block 235.

At block 245, the received processed packet is routed to the logical service that prepared and forwarded the packet in block 235. In one embodiment, VSI hub 130 inspects the received processed packet, determines the logical service that prepared and forwarded the packet in block 235, and routes the received processed packet directly to that logical service. For example, VSI hub 130 may maintain a mapping between logical services 160 and addresses for the physical/virtual network services 170. VSI hub 130 may use source address of the received processed packet to look up a corresponding mapping between the address (e.g., of network service 170A/B/C) and logical service 160A/B/C. In another embodiment, when an inbound processed packet is received by VSI hub 130, the packet is passed to the last logical service in the ordered sequence of services, e.g. logical service C 160C. Logical service C 160C inspects the received packet and looks within the pool of control blocks 165C of logical service C 160C and vNIC 115 to determine whether there is a control block 165C corresponding to the received packet. If there is a control block 165C corresponding to the received packet, then the method has determined the logical service corresponding to the service from which the processed packet has been received. Otherwise, the received packet is passed back to VSI hub 130 to determine whether the packet was sent by a different one of the logical services, e.g. 160A-B. If no control block is found within the pool of control blocks 165A-C for any of the logical services 160A-C for the received packet, the received processed packet is passed back to VSI hub 130 and up to VM 110.

As described above, VSI hub 130 maintains a chain of logical services supported by VSI hub 130. In one embodiment, VSI hub 130 coordinates with the chain of logical services to determine the logical service that prepared and forwarded the packet in block 235. The chain of logical services may be different, or the same, as the ordered sequence of services for preparing and forwarding a particular packet. For example, when a processed packet is received by VSI hub 130 from virtual switch 135, the received processed packet is routed to the last logical service in the VSI hub chain of services. The last logical service in the chain determines whether the last logical service prepared and forwarded the packet in block 235 by attempting to match at least a portion of the received processed packet with a control block of state information stored by the last logical service. If the last logical service in the VSI hub chain was not the logical service that prepared and forwarded the packet in block 235, then the received processed packet is passed to the next-to-last logical service in the chain of services. The process of passing a received processed packet to a logical service for identification is repeated until a logical service in the chain identifies the received processed packet as corresponding to a packet that the logical service prepared and forwarded in block 235 (e.g., by finding a matching control block). If no logical service finds a control block matching the received processed packet, the received processed packet is passed to VM Guest 110 via vNIC 115. Embodiments that route received processed packets sequentially through a chain of logical services may be implemented using a chain of all services supported by VSI hub 130 or a subset of services supported by VSI hub 130. The subset of services may be determined, e.g., by a rule for a packet type, a particular VM Guest 110, a particular tenant, or a particular vNIC. In addition, in some embodiments, VSI hub 130 may maintain a chain of services in an arbitrary structure such as a tree or generalized graph rather than a chain.

As described above, a logical service attempts to identify the received processed packet by matching the received processed packet with a control block of state information. Identifying a packet can comprise looking for a match within the stored state information with any of: one or more address fields in the received packet header, and a unique identifier in the received packet, or other information within the received packet. After the control block has been identified, the method 200 returns to block 210 to determine whether there are more packet services in the ordered sequence of services to process the packet before sending the packet to its destination.

Figure 3:
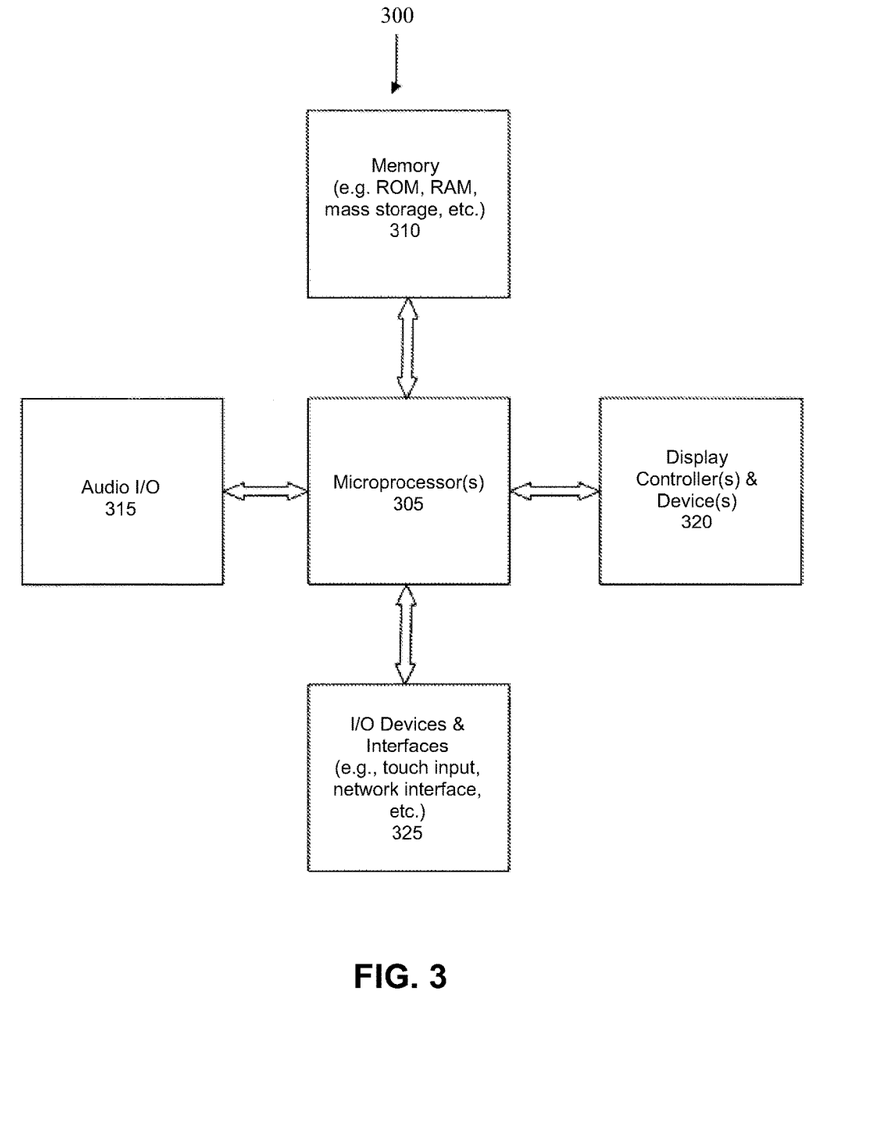
FIG. 3 illustrates the elements of a processing system in a virtual computing environment.

FIG. 3 illustrates, in block diagram form, an exemplary processing system 300 to implement processing a packet using an ordered sequence of services as described herein. Processing system 300 includes memory 310 which is coupled to microprocessor(s) 305. Memory 310 may be used for storing data, metadata, and programs for execution by the microprocessor(s) 305. Memory 310 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 310 may be internal or distributed memory.

Processing system 300 also includes audio input/output subsystem 315 which may include a microphone and/or a speaker for, for example, playing back music or other audio, receiving voice instructions to be executed by microprocessor(s) 305, playing audio notifications, etc. Display controller and display device 320 provides a visual user interface for the user.

Processing system 300 also includes one or more input or output ("I/O") devices and interfaces 325 which are provided to allow a user to provide input to, receive output from, and otherwise transfer data to and from the system. I/O devices 325 may include a mouse, keypad or a keyboard, a touch panel or a multi-touch input panel, camera, optical scanner, network interface, modem, other known I/O devices or a combination of such I/O devices. I/O devices and interfaces 325 may also include a port, connector for a dock, or a connector for a USB interface, FireWire, Thunderbolt, Ethernet, Fibre Channel, etc. to connect the processing system 300 with another device, external component, or a network. Exemplary I/O devices and interfaces 325 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect processing system 300 with another device, external component, or a network and receive stored instructions, data, tokens, etc. It will be appreciated that one or more buses, may be used to interconnect the various components described above.

Data processing system 300 is an exemplary representation of one or more of host 105, network service devices 170A-B, configuration server 175, and client device(s) 180 described above. Data processing system 300 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 300 may be a network computer, server, or an embedded processing device within another device or consumer electronic product. As used herein, the terms computer, device, system, processing system, processing device, and "apparatus comprising a processing device" may be used interchangeably with data processing system 300 and include the above-listed exemplary embodiments.

It will be appreciated that additional components, not shown, may also be part of processing system 300, and, in certain embodiments, fewer components may also be used in processing system 300. It will be apparent from this description that aspects of the inventions may be embodied, at least in part, in software. That is, the computer-implemented method(s) of FIG. 2 may be carried out in a processing system 300 in response to its processor(s) or processing system executing sequences of instructions contained in a memory or other non-transitory machine-readable storage medium. The software may further be transmitted or received over a network (not shown) via network interface device 325. In various embodiments, hardwired circuitry may be used in combination with the software instructions to implement the present embodiments. Thus, the techniques are not limited to any specific combination of hardware circuitry and software, or to any particular source for the instructions executed by processing system 300.

The instructions executed by the processing system may be embodied in a non-transitory computer-readable medium comprising an article of manufacture. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method of processing a first packet using an ordered sequence of services, the first packet having a source, a destination, and a type, the method comprising:

applying policy rules based on one or more attributes of the first packet, the one or more attributes comprising: a packet type, a source address, and a destination address;

based on the applied policy rules, determining the ordered sequence of services for processing the first packet prior to sending the first packet to a destination identified in the first packet, the ordered sequence including a first service and a second service;

altering a destination address of the first packet such that the first packet is sent to the first service and not the destination;

storing, in a memory separate from the first packet, first state information for the first packet associated with the first service, the first state information comprising an indication as to whether the first packet is outbound or inbound, a type of the first packet, and the ordered sequence of services;

preparing and forwarding the first packet to the first service;

receiving a first processed packet from the first service in response to the forwarding of the first packet to the first service;

identifying the first processed packet by comparing the first processed packet with the stored first state information associated with the first service;

upon identifying the first processed packet, storing second state information for the first processed packet associated with the second service, the second state information comprising an indication as to whether the first processed packet is outbound or inbound, a type of the first processed packet, and the ordered sequence of services;

preparing and forwarding the first processed packet to the second service;

receiving a second processed packet from the second service in response to the forwarding of the first processed packet to the second service;

identifying the second processed packet by comparing the second processed packet with the stored second state information associated with the second service; and preparing and forwarding to the second processed packet to the destination.

2. The method of claim 1, wherein altering a destination address of the first packet comprises modifying a header of the first packet to specify a second destination address for the first service.

3. The method of claim 1, wherein the attribute comprises one of: the type of the first packet and an address in a header of the first packet.

4. The method of claim 1, wherein storing, in the memory, the first state information for the first packet comprises storing a header of the first packet in the memory, and storing the first state information for the first processed packet comprises storing, in the memory, a header of the first processed packet.

5. The method of claim 1, wherein comparing the first processed packet with the first state information comprises comparing the first state information stored in the memory with: a source address of the first processed packet, the destination address of the first processed packet, a unique identifier of the first processed packet, a type of service that generated the first processed packet, or any combination of thereof.

6. The method of claim 1, wherein storing, in the memory, state information for the first packet associated with the first service comprises generating, by a logic service, a control block that stores the state information for the first packet associated with the first service; and wherein identifying the first processed packet by comparing the first processed packet with the stored state information associated with the first service comprises identifying, by the logic service, the first processed packet by comparing the first processed packet with the state information stored in the memory.

7. The method of claim 1, wherein the state information is prepared by a logic service, and wherein the method further comprises:

forwarding, by the logic service, the first packet to the first service;

receiving, by the logic service, the first processed packet from the first service; and identifying, by the logic service, the first processed packet by comparing the first processed packet with the stored state information associated with the first service.

8. A non-transitory computer-readable medium programmed with executable instructions that, when executed, implement a method of processing a first packet using an ordered sequence of services, the first packet having a source, a destination, and a type, the method comprising:

applying policy rules based on one or more attributes of the first packet, the one or more attributes comprising: a packet type, a source address, and a destination address;

based on the applied policy rules, determining the ordered sequence of services for processing the first packet, the ordered sequence including a first service and a second service;

storing, in a memory separate from the first packet, first state information for the first packet associated with the first service, the first state information comprising an indication as to whether the first packet is outbound or inbound, a type of the first packet, and the ordered sequence of services;

altering a destination address of the first packet such that the first packet is sent to the first service and not the destination;

preparing and forwarding the first packet to the first service;

receiving a first processed packet from the first service in response to the forwarding of the first packet to the first service;

identifying the first processed packet by comparing the first processed packet with the stored first state information associated with the first service;

storing second state information for the first processed packet associated with the second service, the second state information comprising an indication as to whether the first processed packet is outbound or inbound, a type of the first processed packet, and the ordered sequence of services;

preparing and forwarding the first processed packet to the second service;

receiving a second processed packet from the second service in response to the forwarding of the first processed packet to the second service;

identifying the second processed packet by comparing the second processed packet with the stored second state information associated with the second service; and preparing and forwarding to the second processed packet to the destination.

9. The computer-readable medium of claim 8, wherein preparing the first packet comprises modifying a header of the first packet to specify a destination address for the first service.

10. The computer-readable medium of claim 9, wherein the attribute comprises one of: the type of the first packet and an address in a header of the first packet.

11. The computer-readable medium of claim 8, wherein storing, in the memory, the first state information for the first packet comprises storing a header of the first packet in the memory, and storing the first state information for the first processed packet comprises storing, in the memory, a header of the first processed packet.

12. The computer-readable medium of claim 8, wherein comparing the first processed packet with the first state information comprises comparing the first state information stored in the memory with: a source address of the first processed packet, the destination address of the first processed packet, a unique identifier of the first processed packet, a type of the service that generated the first processed packet, or any combination of thereof.

13. A system for processing a packet, comprising:
a processing device programmed with executable instructions that, when executed, perform a method of processing a first packet using an ordered sequence of services, the first packet having a source, a destination, and a type, the method comprising:
applying policy rules based on one or more attributes of the first packet, the one or more attributes comprising: a packet type, a source address, and a destination address;

based on the applied policy rules, determining the ordered sequence of services for processing the first packet, the ordered sequence including a first service and a second service;

storing, in a memory separate from the first packet, state information for the first packet associated with the first service, the state information comprising an indication as to whether the first packet is outbound or inbound, a type of the first packet, and the ordered sequence of services;

altering a destination address of the first packet such that the first packet is sent to the first service and not the destination;

preparing and forwarding the first packet to the first service;

receiving a first processed packet from the first service in response to the forwarding of the first packet to the first service;

identifying the first processed packet by comparing the first processed packet with the first stored state information associated with the first service;

storing second state information for the first processed packet associated with the second service, the second state information comprising an indication as to whether the first processed packet is outbound or inbound, a type of the first processed packet, and the ordered sequence of services;

preparing and forwarding the first processed packet to the second service;

receiving a second processed packet from the second service in response to the forwarding of the first processed packet to the second service;

identifying the second processed packet by comparing the second processed packet with the second stored state information associated with the second service; and preparing and forwarding to the second processed packet to the destination.

14. The system of claim 13, wherein preparing the first packet comprises modifying a header of the first packet to specify a destination address for the first service.

15. The system of claim 14, wherein the attribute comprises one of: the type of the first packet and an address in a header of the first packet.

16. The system of claim 13, wherein storing, in the memory, the first state information for the first packet comprises storing, by a logical service, a header of the first packet in the memory, and storing the first state information for the first processed packet comprises storing, by the logical service, a header of the first processed packet.

17. The system of claim 13, wherein a service comprises one of: a firewall, network load balancing, encryption, decryption, IP security (IPsec), and generic route encapsulation (GRE).

18. The system of claim 13, wherein comparing the first processed packet with the first state information comprises comparing the first state information stored in the memory with: a source address of the first processed packet, the destination address of the processed packet, a unique identifier of the first processed packet, a type of the service that generated the first processed packet, or any combination thereof.

* * * * *